(No Model.)
C. W. LASHER.
STOVE PIPE DAMPER.
No. 341,023. Patented May 4, 1886.
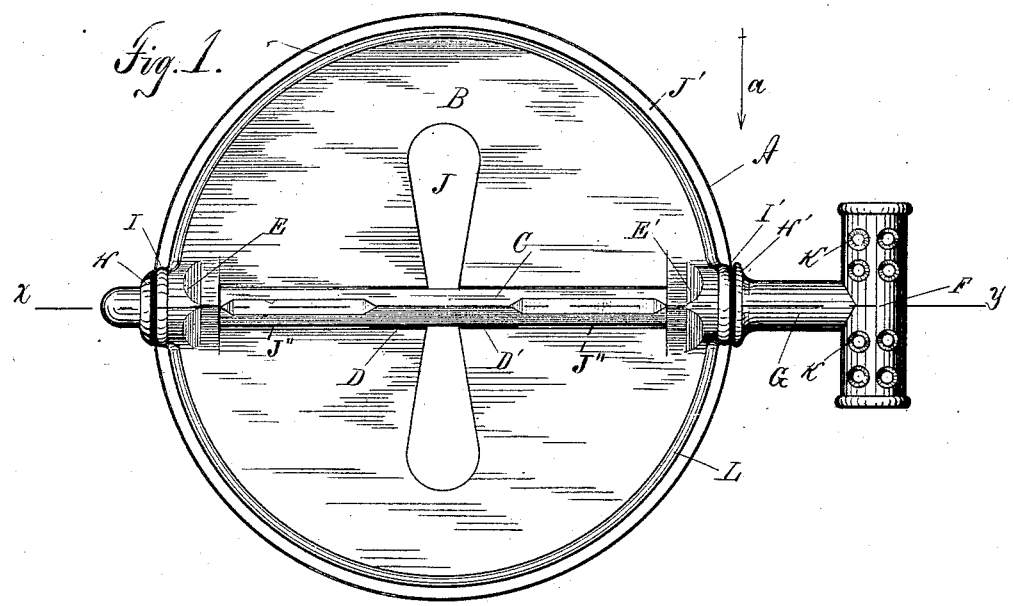
Fig. 1.
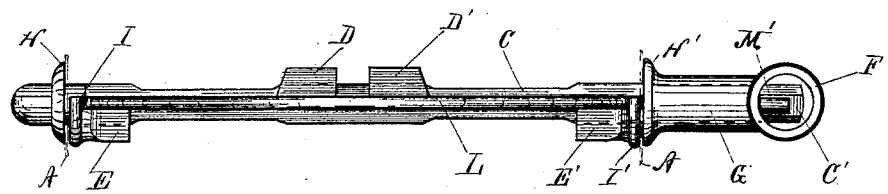
Fig. 2.
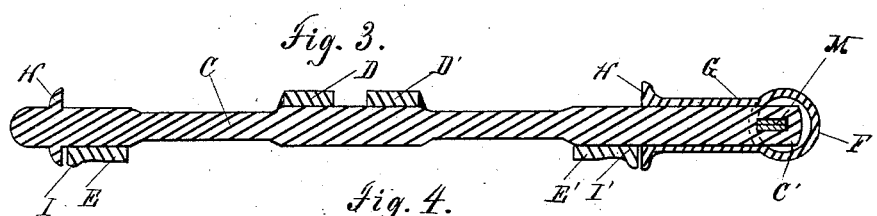
Fig. 3.
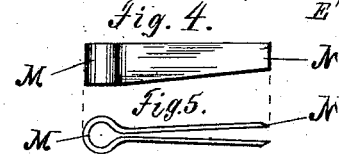
Fig. 4.
Fig. 5.
WITNESSES:
J. A. Crain
INVENTOR
Charles W. Lasher
BY Wiles and Greene
ATTORNEYS

United States Patent Office.

CHARLES W. LASHER, OF DAVENPORT, IOWA.

STOVE-PIPE DAMPER.

SPECIFICATION forming part of Letters Patent No. 341,023, dated May 4, 1886.

Application filed June 15, 1885. Serial No. 168,671. (No model.)

*To all whom it may concern:*

Be it known that I, CHARLES W. LASHER, a resident of Davenport, in the county of Scott and State of Iowa, have invented certain new and useful Improvements in Stove-Pipe Dampers; and I do hereby declare the following to be a full, clear, and exact description of the invention, such as will enable others skilled in the art to which it pertains to make and use the same.

My invention relates to improvements in stove-pipe dampers, and is fully described and explained in the following specification, and shown in the accompanying drawings, in which—

Figure 1 is a plan of my improved damper in place in a section of pipe, the damper being horizontal; Fig. 2, a plan of same, the damper being rotated ninety degrees from the position shown in Fig. 1, so that the blade of the damper is vertical; Fig. 3, a central transverse section of the entire damper—blade, spindle, and handle; Fig. 4 a side elevation, and Fig. 5 an edge view, of the retaining and tightening key M N.

In these views, A is an ordinary stove-pipe, and B a circular damper-blade, preferably of less diameter than the pipe, so that when in place in the pipe it is separated therefrom by an annular space, J'. A diametrical slot, J'', extends across the blade and divides it into two equal parts, which are connected by bridges or clasps D D', near the center of the blade, and by similar clasps, E E', at the margin thereof, the clasps D D' being on one face of the blade, and the clasps E E' on the opposite face thereof. An opening, J, crosses the slot J'' at its center and lies between the two clasps D D'. The clasps E E' are extended outward beyond the circumference of the circular blade B, and form semi-cylindrical shoulders I I', which rest against the inner face of the pipe A. The inner face of each of the clasps D D' E E' is a V-shaped groove or channel, the angle of the V being preferably a right angle, and in the clasps fits closely a square spindle, C, which passes through the pipe at two diametrically-opposite points, and lies in the slot J'' at the center of the blade B.

On one end of the spindle C is an integrally-formed knob or acorn, H, which lies against the outer face of the pipe A, while the opposite end, C', projects outward from the pipe a considerable distance and is pierced by a rectangular slot, M', Fig. 2, whose greatest length is in the line of length of the spindle. The internally-squared shank G of a hollow handle, F, fits upon the spindle end C', the length of the shank and the position of the slot M' being such that the slot is coincident with the opening in the handle, as shown in Fig. 2. By the insertion at one end of the hollow handle F of a tapered cotter, M N, the knob H and the shank G may be drawn together until the inner face of the knob and the bearing-face H' of the shank are pressed with any desired force against the outer surface of the pipe, thus pressing the pipe against the shoulders I I', and affording internal and external friction on the pipe at two opposite points. The cotter M N, when in position, bears against the outer face of the slot M' and against the inner face of the handle, and the tapered form of the cotter affords a means of varying the pressure of the bearing-surfaces at will. When brought to the desired position, the cotter may be readily secured in place by spreading its ends N apart, thus preventing its accidental displacement; and should it be desired to tighten or loosen the parts at any time, the cotter may be readily readjusted.

It will be observed that the pressure of the different bearing-surfaces on the pipe is the positive force obtained by forcing a wedge between the opposing movable parts, and that the cotter employed does not operate as a spring to any degree whatever.

One of the principal objects of this invention is the construction of a simple damper in which spring-pressure of any kind shall be dispensed with, since no spring can long withstand the heat to which it is subjected when used on a damper, but must soon lose its temper and elasticity and become inoperative.

As shown, the hollow handle F is pierced by a series of perforations, K, to prevent heating; but while this is an excellent feature of a damper-handle, it is evidently not essential to the operation of the device.

The spindle C is shown and described as square; but it may evidently have any non-cylindrical form conforming to the clasps D D'

E E', the only object to be attained being that the shank and damper shall turn together.

Having now described and explained my invention, what I claim as new, and desire to secure by Letters Patent, is—

1. The combination, with a suitable damper-blade, of the rod C, passing through and fastened to said blade, and having at one end the knob H and at the other the slot M', the sleeve G, loosely mounted on said rod, and the tapered cotter M N, fitting in said slot and adapted to force the sleeve away from said slot and toward said knob, substantially as shown and described, and for the purpose set forth.

2. The combination, with a damper-blade, B, and a rod, C, passing through and supporting the same, of a sleeve, G, loosely mounted on the rod, a hollow handle, F, formed integrally with the sleeve, and a key or cotter, M N, lying within said hollow handle and passing through said rod, whereby the handle is secured on the rod, substantially as shown and described, and for the purpose set forth.

In testimony whereof I have signed this specification in the presence of two subscribing witnesses.

CHARLES W. LASHER.

Witnesses:
L. M. CURRIER,
J. A. CRAIN.